United States Patent
Bojja et al.

(10) Patent No.: US 11,223,790 B2
(45) Date of Patent: Jan. 11, 2022

(54) PIPELINED ROW DECODER TOPOLOGY FOR FASTER IMAGER ROW DECODING

(71) Applicant: Foveon, Inc., Milpitas, CA (US)

(72) Inventors: Ram Sena Bojja, San Jose, CA (US); Glenn Jay Keller, West Chester, PA (US); Alex Shiuh Wang, Saratoga, CA (US)

(73) Assignee: Foveon, Inc., Milpitas, CA (US)

(*) Notice: Subject to any disclaimer, the term of this patent is extended or adjusted under 35 U.S.C. 154(b) by 63 days.

(21) Appl. No.: 16/891,031

(22) Filed: Jun. 2, 2020

(65) Prior Publication Data

US 2021/0377484 A1 Dec. 2, 2021

(51) Int. Cl.
*H04N 5/376* (2011.01)
*H04N 5/353* (2011.01)
*H04N 5/374* (2011.01)
*H04N 5/378* (2011.01)
*H04N 5/3745* (2011.01)

(52) U.S. Cl.
CPC ........... *H04N 5/3765* (2013.01); *H04N 5/378* (2013.01); *H04N 5/37452* (2013.01)

(58) Field of Classification Search
CPC .. H04N 5/3765; H04N 5/37452; H04N 5/378; H04N 5/3745; H04N 5/374
See application file for complete search history.

(56) References Cited

U.S. PATENT DOCUMENTS 9,137,467 B2 * 9/2015 Kim ..................... H04N 5/3456
10,469,784 B2 * 11/2019 Tate ........................ H04N 5/376

* cited by examiner

*Primary Examiner* — Kelly L Jerabek
(74) *Attorney, Agent, or Firm* — Glass and Associates; Kenneth D'Alessandro; Kenneth Glass

(57) ABSTRACT

An imaging array includes a plurality of rows of pixel sensors. A timing pattern generator generates timing pattern control signals and provide the timing pattern control signals to every row in the array. Timing pattern control signals generated during a timing pattern period directed to operate the pixel sensors in a selected row. A latched row driver circuit includes an enable latch in each row of the array responsive to a row address enable signal provided prior to the timing pattern period to gate the timing pattern control signals to the pixel sensors in the selected row at the start of the timing pattern period. A row address generator circuit is coupled to the timing pattern generator and to the enable latches in each row of the array to generate the row address enable signal for each selected row prior to the timing pattern period.

14 Claims, 7 Drawing Sheets

PIPELINED ROW DECODER TOPOLOGY FOR FASTER IMAGER ROW DECODING

The present invention relates to imaging arrays of pixel sensors. More particularly, the present invention relates to row decoding for operation of pixel sensor arrays and to a pipelined topology for faster imager row decoding.

BACKGROUND

Image sensor operation of pixel sensor arrays formed from photodiode sensors can be split into two separate operations. First, the pixel sensors in the imaging array are exposed to light during an exposure time and then the accumulated signal level (charge/voltage) is read out to a storage element, usually a capacitor. Then the accumulated signal level that has been stored in the storage element is read out over a readout signal path and the charge/voltage is converted to digital outputs.

There are three modes of operation of an array of pixel sensors. First, in a reset mode the pixel sensor is reset to place the pixel into a known state before light exposure. Next in an integrate mode, the pixel is exposed to light and the light is "integrated/captured" thus changing the charge on the photo diode in response to the light exposure. Next, the charges accumulated on sections of the pixel array are transferred to less volatile storage elements such as capacitors, typically near the edge of the pixel array for quick access. Following this transfer, this stored information is read out of the pixel sensor.

If the pixel sensor is not in one of the three modes described above, it is in an idle mode. In idle mode, the pixel does not interfere with other pixels that are either in reset, integrate, or charge transfer mode.

The individual pixel sensors in arrays or pixel sensors are disposed in rows and columns of the array. The above-described operations of the pixel sensors in an array are performed on a row and column basis. The reset, integration, and charge transfer operations are typically conducted on a row of pixel sensors in the array. Following the charge transfer, the transferred charge is typically read out from the row on lines arranged in the column direction of the array.

A typical prior-art imager is depicted in FIG. 1. The imager contains a pixel sensor array including rows and columns of individual pixel sensors. A digital controller provides signal to a row driver circuit that selects individual rows of pixel sensors on which to perform reset, integrate, and charge transfer operations. Once rows are selected, a specific pattern of control voltages (which is referred to herein as a "timing pattern") is applied to various nodes of the pixel sensors in the selected row(s) of the array to perform reset, integrate, and charge transfer operations. Readout circuits are used to read out the transferred charge from pixel sensors after they have been reset and exposed to light. A digital controller controls the operation of the row driver and readout circuits. A control interface allows user interaction to allow for example setting exposure times. Peripheral circuits perform other functions in the pixel sensor array, such as temperature measuring circuits, reference generators, and internal bias and voltage circuits.

The digital controller controls selection of the rows and the running of the specific timing patterns of control signals used to perform the different operations on the selected rows. Considerations such as address settling times and other control line charge-up times limit how quickly an image can be captured and read out from a pixel sensor array. The total image capture and readout times increase with increases in the size of the pixel sensor array as a result of the need to process image data from larger numbers of rows of pixel sensors, and as a result of the physically larger size of the rows and columns.

FIG. 2 illustrates the operation of typical prior-art imaging arrays of pixel sensors. Rows of pixel sensors are addressed by row driver under control of the digital controller, and operations are performed on pixel sensors in the selected row by asserting row-wide control signals to the pixel sensors in the selected row. FIG. 2 first shows as an example the address for row 101 of the pixel sensor array being asserted and the operation to reset the pixel sensors in row 101 being performed. The reset operation occurs prior to exposing the pixel sensors in row 101 to light to capture a portion of an image. Next, the address for row 1 of the pixel sensor array is asserted and the operation to transfer the photocharge of a portion of an image having already been collected by the pixel sensors in row 1 out of the pixel sensors in row 1 is performed. Next, the address for row 102 of the pixel sensor array is asserted and the operation to reset the pixel sensors in row 102 is performed. Next the address for row 2 of the pixel sensor array is asserted and the operation to transfer the photocharge having been collected by the pixel sensors in row 2 out of the pixel sensors in row 2 is performed.

Persons of ordinary skill in the art understand this aspect of the operation of imaging arrays of the type depicted in FIG. 1 and will readily appreciate that the reset and charge transfer operations depicted in FIG. 2 are interleaved. In the illustration show in FIG. 2, the portion of the pixel sensor array including rows 101 and 102 are being reset after photocharge transfer has taken place and the photocharge accumulated in the portion of the pixel sensor array including rows 1 and 2 is being transferred out of the pixel sensor array.

Persons skilled in the art will also appreciate that the time required to perform reset and charge transfer operations depicted in FIG. 2 includes an amount of time sufficient to allow the addresses commanded by the digital controller to be asserted by the row driver circuit to settle and become valid, with additional overhead from other digital control and sampling signals. This total time between assertion of consecutive row addresses may be on the order of 500 nSec. The reset and charge transfer timing patterns cannot be applied to the selected rows until the asserted row addresses and related control signals become valid.

BRIEF DESCRIPTION

In accordance with an aspect of the invention, an imaging array includes a plurality of rows of pixel sensors. A timing pattern generator generates timing pattern control signals and provides the timing pattern control signals to every row in the array, the timing pattern control signals generated during a timing pattern period directed to operate the pixel sensors in a selected row. A latched row driver circuit includes a row enable latch in each row of the array responsive to a row address enable signal provided prior to the timing pattern period to gate the timing pattern control signals to the pixel sensors in the selected row at the start of the timing pattern period. A row address generator circuit is coupled to the timing pattern generator and to the enable latches in each row of the array to generate the row address enable signal for each selected row prior to the timing pattern period.

In accordance with an aspect of the invention, the imaging array further includes timing pattern signal control lines coupled between the timing pattern generator and each row in the array to carry the timing pattern signals to each row in the array.

In accordance with an aspect of the invention, the imaging array further includes in each row individual row timing pattern signal control lines coupled to each pixel sensor in the row.

In accordance with an aspect of the invention, the imaging array further includes in each row, timing pattern control signal switches coupled between the global timing pattern signal control lines and the row timing pattern control signal lines, each of the timing pattern control switches gated by the row enable latch.

In accordance with an aspect of the invention, the row address generator circuit is operatively coupled to operate each row enable latch.

In accordance with an aspect of the invention, the row address generator circuit includes a row enable latch control signal output driving a row enable latch control signal line coupled to each row enable latch, individual row address outputs for individual row address data, an address-valid enable output on an address-valid enable line, and an address row enable latch control signal on the enable latch control signal output prior to the timing pattern period.

In accordance with an aspect of the invention, the timing pattern signal control lines comprise a reset control signal line, a charge transfer control signal line, and a readout select control signal line, the row timing pattern signal control lines in each row comprise an individual row reset line, a row charge transfer line, and a row readout select line coupled to each pixel sensor in each row, and the timing pattern control switches in each row comprise a row reset switch coupled between the reset control signal line and the row reset line and gated by the row enable latch, a row charge transfer switch coupled between the charge transfer control signal line and the row charge transfer line and gated by the row enable latch, and a row readout select switch coupled between the row readout select control signal line and the row readout select line and gated by the row enable latch.

In accordance with an aspect of the invention, the row address generator circuit is configured to output more than one row address to select more than one row prior to the timing pattern period, and the row enable latches are configured such that the more than one row identified by the more than one row address will gate the timing pattern control signals to the pixel sensors in the more than one selected rows at the start of the timing pattern period.

In accordance with an aspect of the invention, a method for operating an imaging array including a plurality of rows of pixel sensors includes, during each timing pattern period, and responsive to gating a row address signal and a row address enable signal latching in a row enable latch in each row of the array one of row selection data and row de-selection data for an immediately following timing pattern period, at a start of the immediately following timing pattern period generating timing pattern control signals and providing the timing pattern control signals to every row in the array, and at the start of the timing pattern period gating the timing pattern control signals to operate the pixel sensors only in rows having latched row selection data.

In accordance with an aspect of the invention, generating timing pattern control signals includes generating a reset control signal, generating a charge transfer control signal, and generating a readout select control signal.

In accordance with an aspect of the invention, gating the timing pattern control signals to the pixel sensors in the selected row at the start of the timing pattern period includes providing in each row a timing control pattern switch for each timing control pattern signal, and activating all of the timing control pattern switches for each timing control pattern signal only in the rows having latched row selection data at the start of the timing pattern period.

In accordance with an aspect of the invention, gating the timing pattern control signals to the pixel sensors only in the rows having latched row selection data at the start of the timing pattern period includes gating the reset control signal to a row reset line in the selected row, gating the charge transfer control signal to a charge transfer line in the selected row, and gating the readout select control signal to a row readout select line in the selected row.

In accordance with an aspect of the invention, latching in the row enable latch in each row of the array responsive to a row address signal and a row address enable signal one of row selection data and row de-selection data includes latching row selection data in more than one row.

In accordance with an aspect of the invention, latching in a row enable latch in each row of the array responsive to a row address signal and a row address enable signal one of row selection data and row de-selection data includes gating the row address signal with the row address enable signal and latching in each row the gated row address signal and the one of row selection data and row de-selection data.

BRIEF DESCRIPTION OF THE DRAWING FIGURES

The invention will be explained in more detail in the following with reference to embodiments and to the drawing in which are shown:

DETAILED DESCRIPTION

Persons of ordinary skill in the art will realize that the following description is illustrative only and not in any way limiting. Other embodiments will readily suggest themselves to such skilled persons.

In accordance with an aspect of the present invention, a latched row driver circuit is provided. Row enable latches provided at each row preselect rows whose pixels will execute the next timing pattern. At least one row address is set and stored in the row enable latches prior to the start of a timing pattern period so that it is immediately enabled at the start of a timing pattern period when a timing pattern is applied to all of the rows in the array. The timing pattern is executed only by the row or rows that have been preselected.

Setting the addresses prior to the start of the timing pattern removes all of the latency that is associated with address settling. Because the timing patterns are provided to all of the rows in the array, multiple address can be activated for both reset and charge transfer timing patterns with no timing overhead.

The array size (number of rows in the array) does not cause additional design changes. Only the timing pattern signal drive needs to be strengthened.

Use of the present invention substantially speeds up the readout with only addition of the row enable latches without increasing per-row row decoder silicon area.

Figure 3:
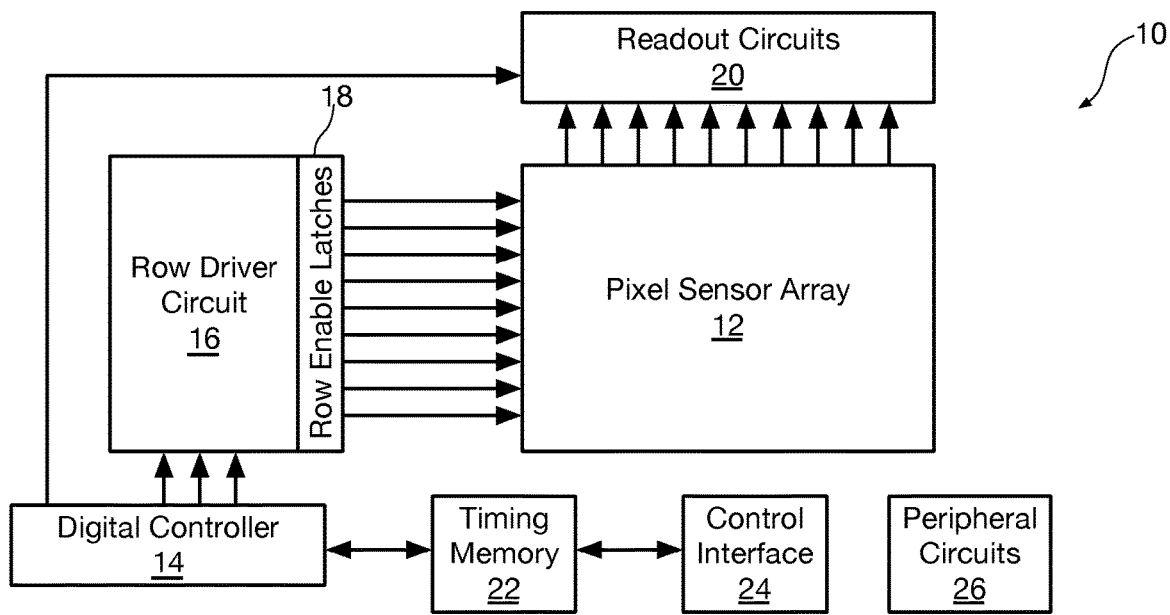
FIG. 3 is a block diagram of a pixel sensor array in accordance with an aspect of the invention.

Referring first of all to FIG. 3, a block diagram shows an illustrative imager 10 including a pixel sensor array 12. The pixel sensor array 12 is arranged as an array of rows and columns of individual pixel sensors as will be seen herein. In one embodiment, the pixel sensors may be pixel sensors employing photodiodes as is known in the art and may be vertical color CMOS pixel sensors as is known in the art and manufactured by Foveon, Inc., of San Jose, Calif., although persons of ordinary skill in the art will readily appreciate that other pixel sensor technologies may be employed in imagers that are configured to operate in accordance with the present invention.

Image capture and readout is directed by a digital controller 14 that controls a row driver circuit 16 to operate the individual pixel sensors in the array 12 to capture images and read out the captured images. The row driver circuit 16 includes row enable latches 18 that allow rows of the array to be addressed more efficiently than in prior-art imagers. The captured image data is read out from the pixel array using readout circuits 20 as will be described herein.

A timing memory 22 is coupled to the digital controller 14 and provides timing control information for the digital controller 14 to use to generate control signals to drive the row driver circuit 14, the row enable latches 18, and the readout circuits 20. A control interface 24 allows user interaction to allow, for example, setting exposure times. Peripheral circuits 26 perform other functions in the pixel sensor array, such as temperature measuring circuits, reference generators, and internal bias and voltage circuits.

Figure 1:
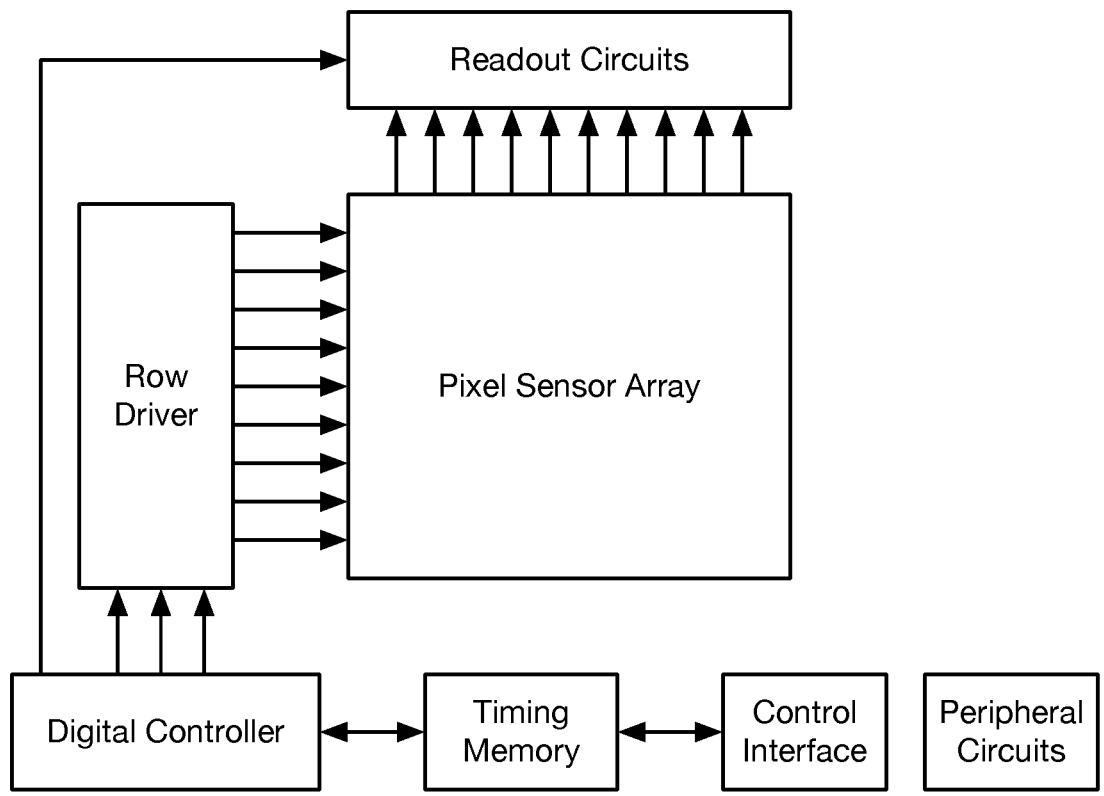
FIG. 1 is a block diagram of a typical prior-art pixel sensor array.
Figure 2:
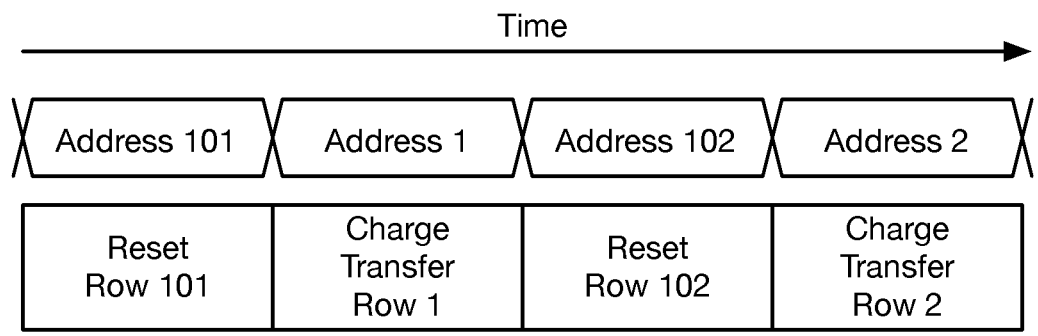
FIG. 2 is a timing diagram showing operation of a typical row driver circuit such as the one in the prior-art pixel sensor array of FIG. 1.

The operation of the imager 10 of FIG. 3 is different from the operation of the prior-art imager of FIG. 1. Use of the row driver circuit 16 that includes row enable latches 18 allows pre-loading of the selected row addresses to reduce address settling time latency in the operation of the imager 10. This aspect of the invention is illustrated in FIG. 4.

Figure 4:
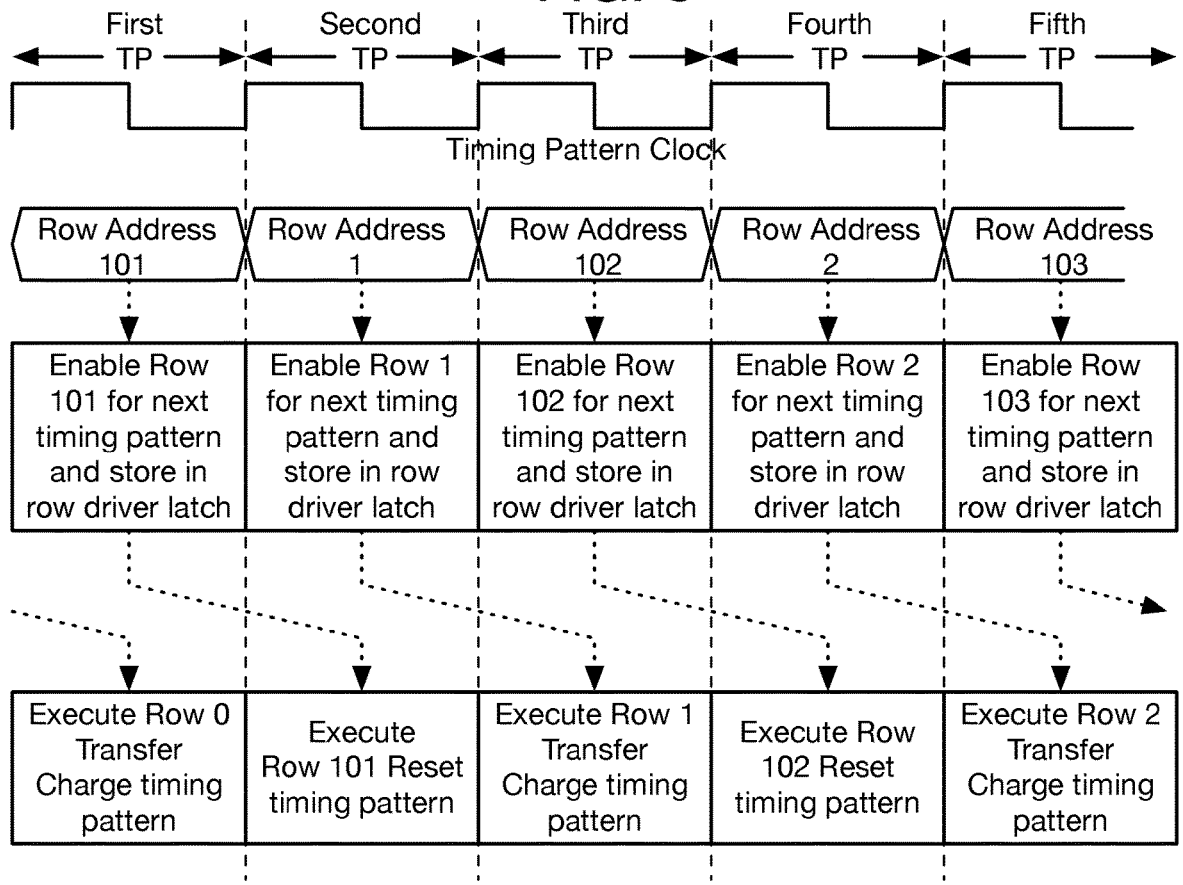
FIG. 4 is a timing diagram showing operation of the latched row driver circuit in the pixel sensor array of FIG. 3.

The first line of FIG. 4 is a waveform representing a timing pattern clock. Periods of the timing pattern clock are indicated by the vertical dashed lines in FIG. 4. Timing pattern control signals are asserted during each period of the timing pattern clock and are broadcast to all of the rows in the array. As will be shown herein, only pixels in rows that have been selected during the previous timing pattern period respond to the timing pattern control signals.

As shown in FIG. 4, during the first timing pattern period, row address 101 is asserted to the row driver circuit 14 in FIG. 3 by the digital controller 14. During this period, row 101 is enabled for the next (second) timing pattern by storing an enable signal for that row in the row enable latch associated with row 101. During the first timing period, a timing pattern is executed for the pixel sensors in the row whose address had been latched during the previous timing pattern clock period. This row is shown in FIG. 4 as row 0.

During the second timing pattern period, row address 1 is asserted to the row driver circuit 14 in FIG. 3 by the digital controller 14. During this period, row 1 is enabled for the next (third) timing pattern by storing an enable signal for that row in the row enable latch associated with row 1. During the second timing pattern period, a timing pattern is executed for the pixel sensors in row 101 whose address had been latched during the previous (first) timing pattern period.

During the third timing pattern period, row address 102 is asserted to the row driver circuit 14 in FIG. 3 by the digital controller 14. During this timing pattern period, row 102 is enabled for the next (fourth) timing pattern by storing an enable signal for that row in the row enable latch associated with row 102. During the third timing pattern period, a timing pattern is executed for the pixel sensors in row 1 whose address had been latched during the previous (second) timing pattern period.

During the fourth timing pattern period, row address 2 is asserted to the row driver circuit 14 in FIG. 3 by the digital controller 14. During this timing pattern period, row 2 is enabled for the next (fifth) timing pattern by storing an enable signal for that row in the row enable latch associated with row 2. During the fourth timing pattern period, a timing pattern is executed for the pixel sensors in row 102 whose address had been latched during the previous (third) timing pattern period.

During the fifth timing pattern period, row address 103 is asserted to the row driver circuit 14 in FIG. 3 by the digital controller 14. During this timing pattern period, row 103 is enabled for the next (sixth) timing pattern by storing an enable signal for that row in the row enable latch associated with row 103. During the fifth timing pattern period, a timing pattern is executed for the pixel sensors in row 2 whose address had been latched during the previous (fourth) timing pattern period.

Figure 5:
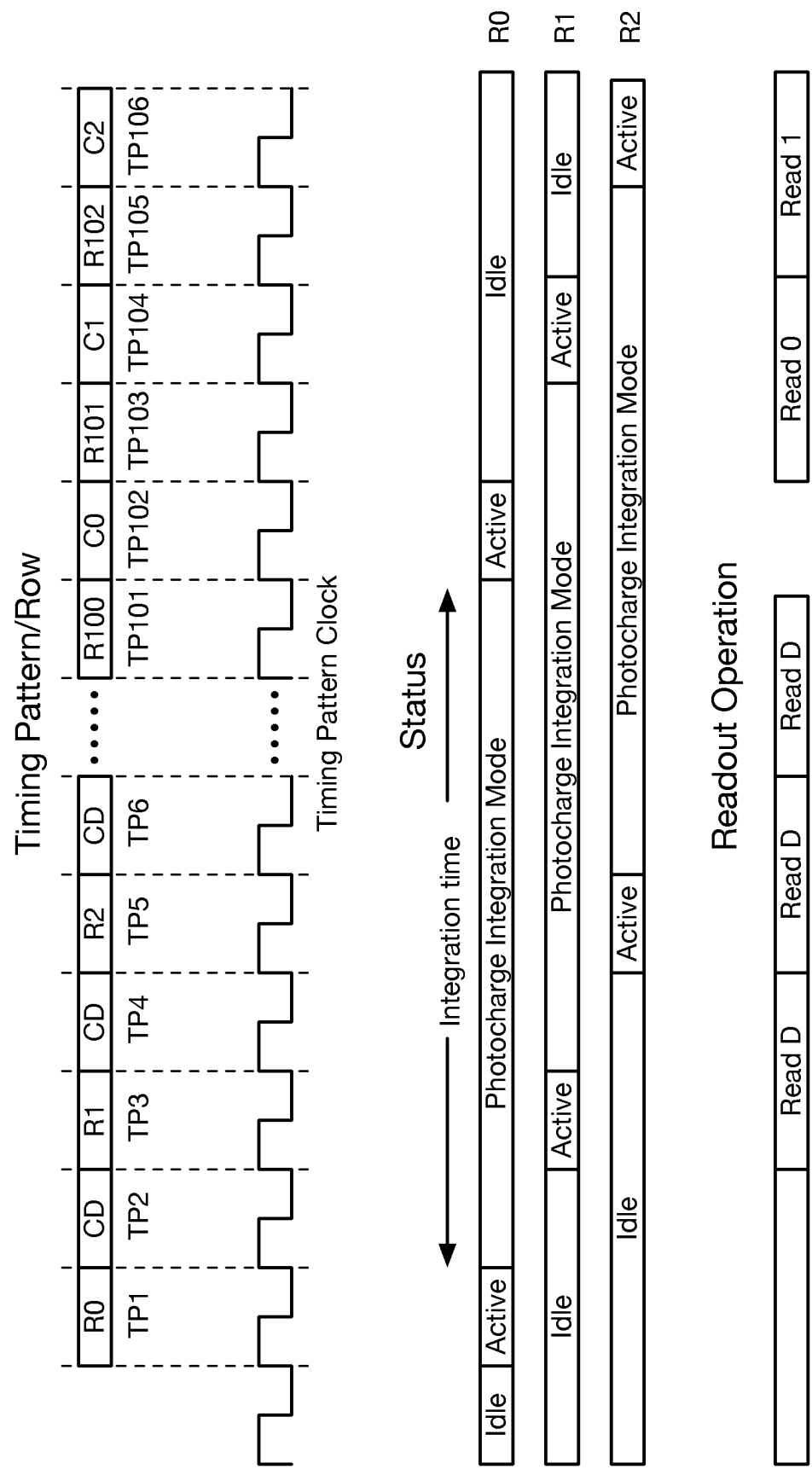
FIG. 5 is a diagram showing execution of timing patterns in an illustrative pixel sensor array in accordance with an aspect of the invention.

Referring now to FIG. 5, another aspect of the operation of the imager of the present invention is depicted. Two groups of timing pattern periods are shown in the Timing Pattern/Row portion of FIG. 5, timing pattern periods TP1 through TP6 are shown on the left side of FIG. 5 and timing pattern periods TP101 through TP106 are shown on the right side of FIG. 5. The operations shown in the timing pattern periods alternate between resetting rows of pixel sensors to prepare for light exposure (represented by "R" followed by the row number) and transferring charge out of rows of pixel sensors after light exposure has ended (represented by "C" followed by the row number)

During timing pattern period TP1 the pixel sensors in row 0 are reset. During timing pattern period TP2 a charge transfer operation is executed. At the beginning of the operation of the imager there are no rows of exposed pixel sensors, so a dummy row (designated as "D") is addressed. During timing pattern period TP3 the pixel sensors in row 1 are reset. During timing pattern period TP4 a charge transfer operation is executed on a dummy row D. During timing pattern period TP5 the pixel sensors in row 2 are reset.

During timing pattern period TP6 a charge transfer operation is executed on a dummy row D.

In the illustrative example shown in FIG. 5, the integration time (i.e., exposure time when photocharge is accumulated in the pixel sensors of the array) of the imager is shown as being set to approximately 202 timing pattern periods as indicated by the integration time arrow. Thus, as shown in FIG. 5, during timing pattern period TP101 the pixel sensors in row 100 are reset. By this time, the row 0 has been reset and has been subjected to exposure for a period of time equal to 101 timing patterns. By the start of timing pattern period TP102 accumulated photocharge is available to be transferred out of the pixel sensors in row 0 and that photocharge is transferred as indicated by the operation "C0" at the top line of FIG. 5.

During timing pattern period TP103 the pixel sensors in row 101 are reset. By this time, the row 1 has been reset and has been subjected to exposure for a period of time equal to 101 timing patterns. During timing pattern period TP104 a charge transfer operation is executed on the pixel sensors in row 1. During timing pattern period TP105 the pixel sensors in row 102 are reset. During timing pattern period TP6 a charge transfer operation is executed on the pixel sensors in row 2.

In the "Status" portion of FIG. 5 illustrating the status of the pixel sensors in rows 0, 1, and 2 of the pixel sensor array, the "Active", "Idle", or "Photocharge Integration Mode" status of the pixel sensors in rows 0, 1, and 2 of the pixel sensor array is shown. The reset and charge transfer operations are the Active states of the rows of pixel sensors and any rows of pixel sensors that are not in the Active or Photocharge Integration Mode states are in "Idle" states.

Readout operations are shown in the "Readout Operation" portion of FIG. 5. As will be shown herein, the timing pattern for charge transfer may also include the control signals for readout of the charge transferred from the pixel sensors. The first several readouts are from dummy rows since there are no real rows of pixel sensors from which transferred charge can be read. FIG. 5 shows the readout operation commencing following the charge transfer timing pattern periods, but persons of ordinary skill in the art will appreciate that the beginning of the readout period for the transferred charge in any row may occur at any time following completion of the charge transfer.

From the examples given in FIG. 5 persons of ordinary skill in the art can easily extrapolate the operations of the remaining rows in the pixel sensor array.

Figure 6:
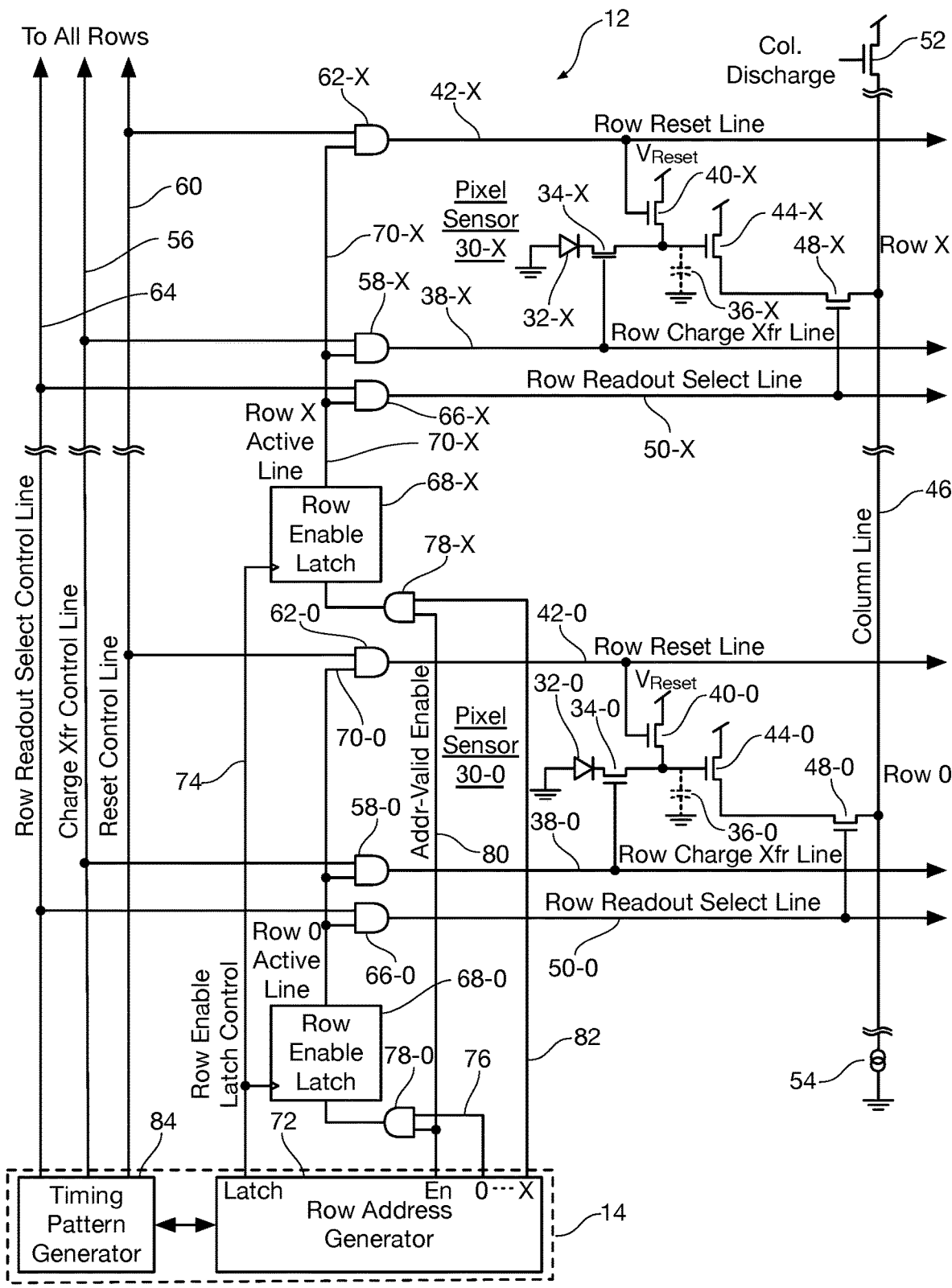
FIG. 6 is a block diagram showing a portion of an illustrative digital controller, latched row driver circuit and pixel sensor array in accordance with an aspect of the invention.

Referring now to FIG. 6, a schematic diagram shows a portion of an illustrative pixel sensor array 12 in accordance with an aspect of the present invention. One pixel sensor in each of two rows is shown for illustration. A pixel sensor 30-0 is shown in row 0 and of the pixel sensor array 12 and an identical pixel sensor 30-X shown in row X of the pixel sensor array. Pixel sensors 30-0 and 30-X are representative of any number of different pixel sensors that may be utilized in the present invention, and persons of ordinary skill in the art will be readily able to adapt the principles of the present invention to other pixel sensor configurations.

Pixel sensor 30-0 uses photodiode 32-0 as a photocharge collector as is known in the art. Charge accumulated by the photodiode 32-0 is transferred through charge transfer transistor 34-0 to a floating node represented by capacitor 36-0 shown in dashed lines. Persons of ordinary skill in the art will appreciate that capacitor 36-0 is not an actual component but rather represents the inherent capacitance of the floating node. The gate of the charge transfer transistor 34-0 is driven by a row charge transfer line 38-0.

The floating node 36-0 is reset to a known potential prior to charge accumulation through a reset transistor 40-0 coupled to a reset potential Vreset. The gate of the reset transistor 40-0 is driven by a row reset line 42-0.

A source-follower transistor 44-0 has its gate coupled to the floating node 36-0 and is coupled to a column line 46 through a row readout select transistor 48-0. The gate of the row readout select transistor 48-0 is driven by a row readout select line 50-0 to output the transferred charge to the column line 46. The row charge transfer line 38-0, the row reset line 42-0, and the row readout select line 50-0 may collectively be referred to as row timing pattern signal control lines. The column line 46 is driven by a column discharge transistor 52 and a current source 54 as is known in the art.

The configuration of the pixel sensor 30-X in row X of the pixel sensor array is the same as the configuration of the pixel sensor 30-0 in row 0 of the pixel sensor array 12. Pixel sensor 30-X uses photodiode 32-X as a photocharge collector as is known in the art. Charge accumulated by the photodiode 32-X is transferred through charge transfer transistor 34-X to a floating node represented by capacitor 36-X shown in dashed lines. Persons of ordinary skill in the art will appreciate that capacitor 36-X is not an actual component but rather represents the inherent capacitance of the floating node. The gate of the charge transfer transistor 34-X is driven by a row charge transfer line 38-X.

The floating node 36-X is reset to a known potential prior to charge accumulation through a reset transistor 40-X coupled to a reset potential Vreset. The gate of the reset transistor 40-X is driven by a row reset line 42-X.

A source-follower transistor 44-X has its gate coupled to the floating node 36-X and is coupled to the column line 46 through a row readout select transistor 48-X. The gate of the row readout select transistor 48-X is driven by a row readout select line 50-X to output the transferred charge to the column line 46. The row charge transfer line 38-X, the row reset line 42-X, and the row readout select line 50-X may also collectively be referred to as row timing pattern signal control lines.

In prior-art pixel sensor arrays, the row reset lines 42-0 and 42-X, the row charge transfer lines 38-0 and 38-X, and the row readout select lines 50-0 and 50-X used to operate the pixel sensors 30-0 and 30-X, respectively would be directly driven by reset, charge transfer and row readout signals from the digital controller of FIG. 1 gated by the specific row address decode. In the present invention, these signals are coupled into the pixel sensors 30-0 and 30-X by row enable timing pattern control switches as shown in FIG. 6.

The row charge transfer line 38-0 of the pixel sensor 30-0 in row 0 of the pixel sensor array is coupled to a global charge transfer control line 56 for the entire pixel sensor array through a row charge transfer timing pattern control switch 58-0. The row charge transfer line 38-X of the pixel sensor 30-X in row X of the pixel sensor array is also coupled to the global charge transfer control line 56 of through a row charge transfer timing pattern control switch 58-X.

The row reset line 42-0 coupled to the pixel sensor 30-0 in row 0 of the pixel sensor array is coupled to a global reset control line 60 for the entire pixel sensor array through a row reset timing pattern control switch 62-0. The row reset line 42-X of the pixel sensor 30-X in row X of the pixel sensor array is also coupled to the global reset control line 60 of through a row reset timing pattern control switch 62-X.

The row readout select line 50-0 of the pixel sensor 30-0 in row 0 of the pixel sensor array is coupled to a global row readout select control line 64 for the entire pixel sensor array through a row readout select timing pattern control switch 66-0. The row readout select line 50-X of the pixel sensor 30-X in row X of the pixel sensor array is also coupled to the global row readout select control line 64 through a row readout select timing pattern control switch 66-X.

The row charge transfer timing pattern control switch 58-0, the row charge transfer timing pattern control switch 58-X, the row reset timing pattern control switch 62-0, the row reset timing pattern control switch 62-X, the row readout select timing pattern control switch 66-0, and the row readout select timing pattern control switch 66-X are depicted in FIG. 6 as logic gates, in particular, AND gates, one input of each being coupled to the appropriate one of the global charge transfer control line 56, the global reset control line 60, and the global row readout select control line 64. Persons of ordinary skill in the art will readily understand that other logic gates could be employed as well as other types of switches such as transistors.

In the embodiment shown in FIG. 6, the other input of each of the logic gates forming the row charge transfer timing pattern control switch 58-0, the row reset timing pattern control switch 62-0, and the row readout select timing pattern control switch 66-0 are connected together to the output of a row enable latch 68-0 on a row 0 active line 70-0 Similarly, the other input of each of the logic gates forming the row charge transfer timing pattern control switch 58-X, the row reset timing pattern control switch 62-X, and the row readout select timing pattern control switch 66-X are connected together to the output of a row enable latch 68-X on a row X active line 70-X. The row enable latches 68-0 and 68-X are clocked by a row enable latch control signal output from a row address generator circuit 72 in the digital controller 14 on line 74. The row enable latches 68-0 and 68-X are used to control the row charge transfer timing pattern control switches 58-0 and 58-X, the row reset timing pattern control switches 62-0 and 62-X, and the row readout select timing pattern control switches 66-0 and 66-X to selectively gate the signals from the global row charge transfer select control line 56 to the row charge transfer lines 38-0 and 38-X, to selectively gate the signals from the global row reset control line 60 to the row reset lines 42-0 and 42-X, and selectively gate the signal from the global row readout select control line 64 to the row readout select lines 50-0 and 50-X. In the embodiment shown in FIG. 6 the output of the row enable latches 68-0 and 68-X that enables the row (a logic 1 level in the circuit of FIG. 6) is referred to as row selection data and the output of the row enable latches 68-0 and 68-X that disables the row (a logic 0 level in the circuit of FIG. 6) is referred to as row de-selection data.

The data for the enable latch 68-0 is provided by the address 0 output of the row address generator circuit 72 on line 76 ANDed in AND gate 78-0 with an address-valid enable signal on line 80 from the row address generator circuit 72. The data for the an enable latch 68-X is provided by the address X output of the row address generator circuit 72 on line 82 ANDed in AND gate 78-X with the address-valid enable signal on line 80 from the row address generator circuit 72. The address-valid enable signal on line 80 indicates when the address output on any address lines from row address generator circuit 72 (e.g., address line 0 on line 76 and address line X on line 82) is valid. The data supplied to the enable latch 68-0 will be true (logic 1) only if the address 0 output 76 of the row address generator circuit 72 is true (logic 1). The data supplied to the enable latch 68-X will be true (logic 1) only if the address X output 82 of the row address generator circuit 72 is true (logic 1).

The timing control signals on the global row charge transfer control line 56, the global row reset control line 60, and the global row readout select control line 64 are generated in a timing pattern generator 84 in the digital controller 12. The operation of the timing pattern generator 84 is coordinated with the row address generator circuit 72 by digital controller 14.

Figure 7:
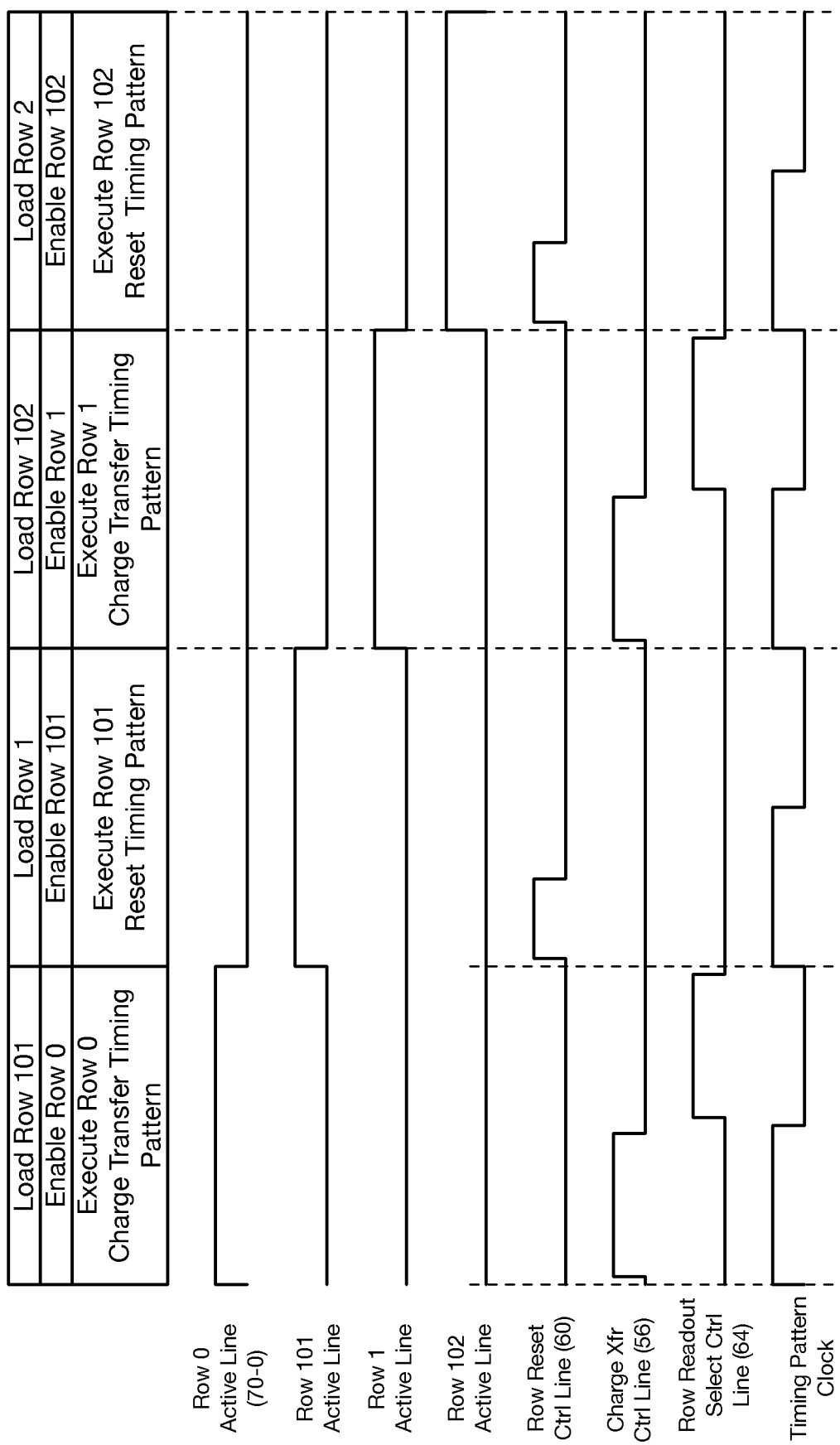
FIG. 7 is a timing diagram showing timing patterns executed by exemplary rows of the pixel sensor array of FIG. 6 in accordance with an aspect of the invention.

FIG. 7 is a timing diagram showing an illustrative timing pattern for the control signals that operate the pixel sensor array 12 depicted in FIG. 6. Signals that appear on the timing pattern and other control lines shown in FIG. 6 are indicated in FIG. 7 in parentheses by the reference numerals identifying those control lines. The text in the boxes above the waveforms explain what operations are taking place during the illustrated timing pattern periods. Persons of ordinary skill in the art will observe that the timing pattern control signals are slightly delayed from the beginning of each timing pattern period to assure that there are no setup time violations in providing those control signals to the pixel sensors in the selected rows.

Figure 8:
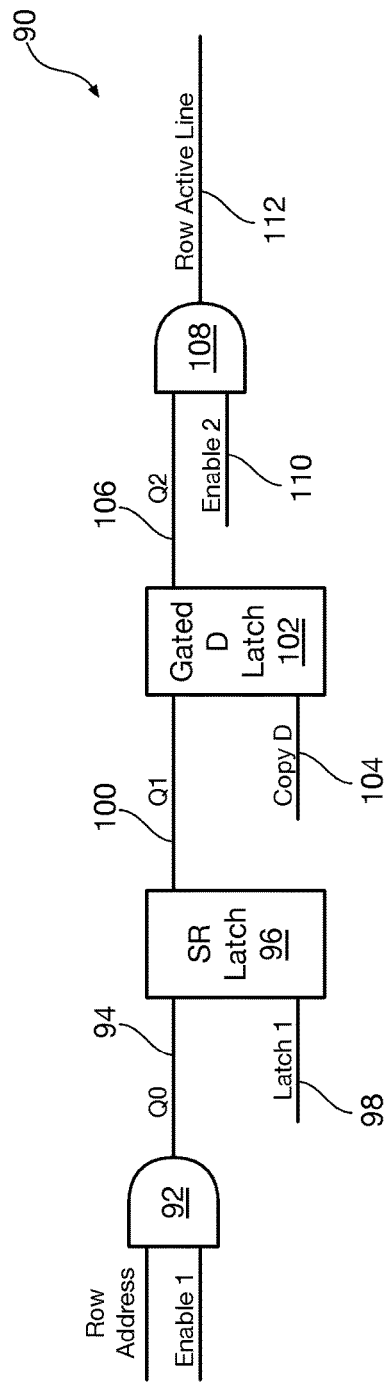
FIG. 8 is an illustrative circuit for implementing for each row the latch element shown in FIG. 6 that allows multiple rows to be selected to implement timing patterns to simultaneously perform pixel sensor functions.
Figure 9:
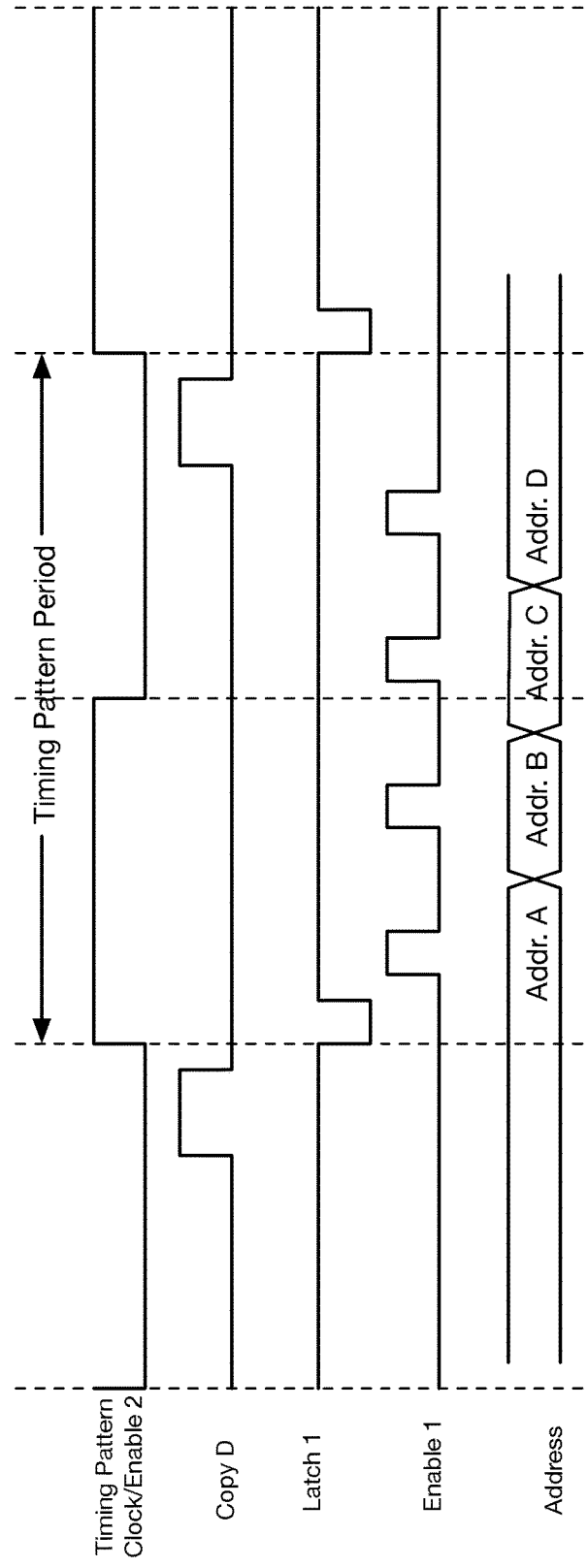
FIG. 9 is a timing diagram showing an illustration of the operation of the latch element circuit of FIG. 8 to select four rows to implement timing patterns to simultaneously perform pixel sensor functions.

In accordance with an aspect of the present invention, more than one row can be selected to respond to the timing pattern control signals during any timing pattern period. FIG. 8 is a schematic diagram of an illustrative row enable latch circuit 90 for implementing the row enable latches 68-0 and 68-X in FIG. 6 in accordance with an embodiment of the invention that allows selecting more than one row to respond to the timing pattern control signals during any timing pattern period. One of these row enable latch circuits 90 is associated with each row in the pixel sensor array 12 of FIG. 6. In the particular instance shown in FIG. 7, the latch circuit 90 is associated with any row of the pixel sensor array. FIG. 9 is a timing diagram showing the control signals applied to the latch circuit in a defined timing pattern period identified by the arrows in the center of the drawing figure.

An AND gate 92 (equivalent to either of AND gates 78-0 and 78-X in FIG. 6) has the row address signal presented on a first input and the address-valid enable signal 80 from the row address generator circuit 72 of FIG. 6 presented on a second input. The output of the AND gate 92 is a signal Q0 on line 94 which is true (logic 1) only if the row address is true (meaning that row has been selected by the row address generator circuit 72). The Q0 signal is presented to the data input of SR latch 96. The SR latch 96 is clocked by a Latch 1 signal on line 98. Its output signal Q1 on line 100 is presented to a gated D latch 102 which is clocked on line by the signal Copy D.

The output signal Q2 of the gated D latch 102 on line 106 is presented to a first input of an AND gate 108. An Enable 2 signal on line 110 is provided to a second input of AND gate 108. The output of AND gate 108 is the Row Active line 112 for that row (e.g., seen at reference numerals 70-0 and 70-X for rows 0 and X, respectively, in FIG. 6).

The signal Latch 1 on line 98 is asserted at the rising edge of the timing pattern clock (Timing Pattern Clock/En2) that defines the start of the Timing Pattern Period shown in FIG. 9. When the Latch 1 signal on line 98 goes low, it resets the SR latch 96 and when the Latch 1 signal on line 98 again goes high, the SR latch 96 latches whatever value is presented to it on Q0 line 94. Referring to FIG. 9, in the latch circuit 90 that is associated with row A of the pixel sensor array 12 the first Enable 1 pulse which is coincident with address A being asserted by the row address generator circuit 72 will set the SR latch 96 to output a logic high level.

As shown in FIG. 9, after address A has been asserted by the row address generator circuit 72 of FIG. 6, the row address generator circuit 72 asserts address B. In the latch circuit 90 that is associated with row B of the pixel sensor array 12, the second Enable 1 pulse which is coincident with address B being asserted by the row address generator circuit 72 will set the SR latch 96 of the latch circuit 90 associated with row B of the pixel sensor array 12 to output a logic high level.

As shown in FIG. 9, after address B has been asserted by the row address generator circuit 72 of FIG. 6, the row address generator circuit 72 asserts address C. In the latch circuit 90 that is associated with row C of the pixel sensor array 12, the third Enable 1 pulse which is coincident with address C being asserted by the row address generator circuit 72 will set the SR latch 96 of the latch circuit 90 associated with row C of the pixel sensor array 12 to output a logic high level.

As shown in FIG. 9, after address C has been asserted by the row address generator circuit 72 of FIG. 6, the row address generator circuit 72 asserts address D. In the latch circuit 90 that is associated with row D of the pixel sensor array 12, the fourth Enable 1 pulse which is coincident with address D being asserted by the row address generator circuit 72 will set the SR latch 96 of the latch circuit 90 associated with row D of the pixel sensor array 12 to output a logic high level.

The SR latches 96 in the latch circuits 90 associated with all of rows A, B, C, and D in the pixel sensor array 12 are now set. The Copy D signal is asserted on the clock line 104 of all of the gated D latch circuits 102 associated with all of the rows in the pixel sensor array 12. In the scenario presented in FIG. 9, only the SR latches 96 of the latch circuits 90 associated with rows A, B, C, and D of the pixel sensor array 12 array have been set. Thus the Q2 outputs of the gated D latch circuits 102 associated with rows A, B, C, and D of the pixel sensor array 12 will be set to a high logic state. All of the Q2 outputs of the gated D latch circuits 102 associated with all other rows of the pixel sensor array 12 will be set to a logic low state. The data defining rows to be active during the next timing pattern period (i.e. the next time the Timing Pattern clock enable 2 goes high) are now set.

At the start of the next timing pattern period the timing pattern clock (which is also signal Enable 2), the outputs of the AND gates 108 of the latch circuits 90 associated with rows A, B, C, and D of the pixel sensor array 12 array will go to a high logic state and the outputs of the AND gates 108 of the latch circuits 90 associated with all of the other rows of the pixel sensor array 12 array will go to a low logic state. As noted, the outputs of the AND gates 108 are the Row Active lines 70-0 and 70-X of the rows of the pixel sensor array 12 shown in FIG. 6. In the scenario presented in this discussion of FIGS. 8 and 9, the Row Active lines of the rows A, B, C, and D of the pixel sensor array 12 will turn on the charge transfer timing pattern control switches 56, the reset timing pattern control switches 60, and the row readout select timing pattern control switches 64 in rows A, B, C, and D, thus passing the timing pattern control signals into only those rows A, B, C, and D. Persons of ordinary skill in the art will appreciate that the designations A, B, C, and D used to represent addresses in the discussion accompanying FIG. 9 are used solely for convenience and are not meant to imply that multiple selected addresses must be consecutive. In fact according to this aspect of the invention there is no requirement that multiple selected addresses be consecutive and any desired pattern of multiple addresses may be selected depending on the use to which this feature of the invention is being put.

Figure 10:
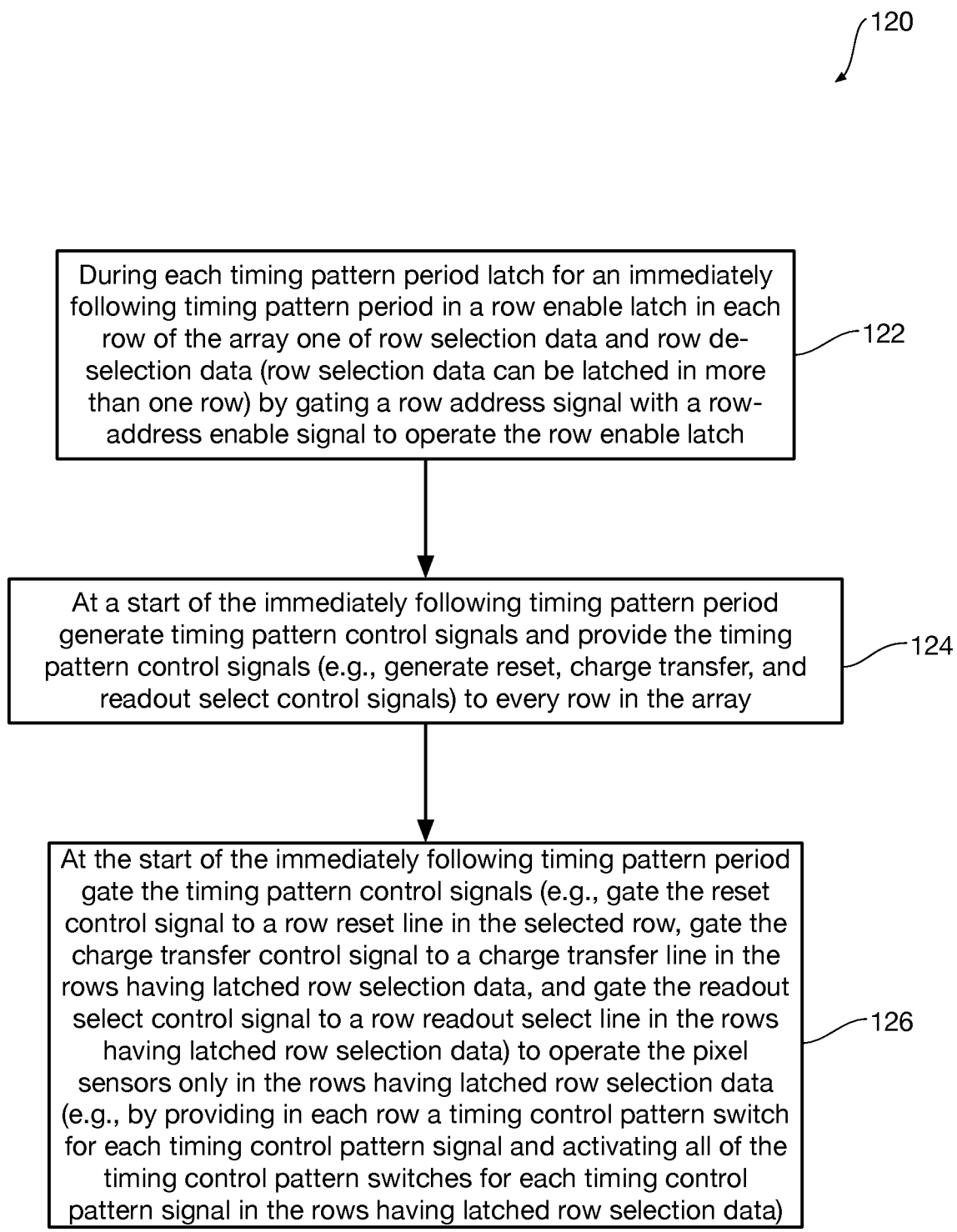
FIG. 10 is a flow diagram illustrating a method for operating an imaging array including a plurality of rows of pixel sensors in accordance with an aspect of the present invention.

Referring now to FIG. 10, a flow diagram illustrates a method 120 for operating an imaging array including a plurality of rows of pixel sensors in accordance with an aspect of the present invention.

At reference numeral 122, during each timing pattern period, for an immediately following timing pattern period one of row selection data and row de-selection data (row selection data can be latched in more than one row) is latched in a row enable latch in each row of the array by gating a row address signal with a row-address enable signal to operate the row enable latch.

At reference numeral 124, at a start of the immediately following timing pattern period, timing pattern control signals (e.g., generate reset, charge transfer, and readout select control signals) are generated and provided to every row in the array.

At reference numeral 126, at the start of the immediately following timing pattern period, the timing pattern control signals (e.g., gate the reset control signal to a row reset line in the selected row, gate the charge transfer control signal to a charge transfer line in the rows having latched row selection data, and gate the readout select control signal to a row readout select line in the rows having latched row selection data) are gated to operate the pixel sensors only in the rows having latched row selection data by providing in each row a timing control pattern switch for each timing control pattern signal and activating all of the timing control pattern switches for each timing control pattern signal in the rows having latched row selection data as previously discussed with reference to FIGS. 6 and 7, e.g., by providing in each row a timing control pattern switch for each timing control pattern signal and activating all of the timing control pattern switches for each timing control pattern signal in the rows having latched row selection data.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An imaging array comprising:
    a plurality of rows of pixel sensors;
    a timing pattern generator to generate timing pattern control signals and provide the timing pattern control signals to every row in the array, the timing pattern control signals generated during a timing pattern period directed to operate the pixel sensors in a selected row;
    a latched row driver circuit including a row enable latch in each row of the array responsive to a row address enable signal provided prior to the timing pattern period to gate the timing pattern control signals to the pixel sensors in the selected row at the start of the timing pattern period; and
    a row address generator circuit coupled to the timing pattern generator and to the enable latches in each row of the array to generate the row address enable signal for each selected row prior to the timing pattern period.

2. The imaging array of claim 1 further comprising:
    timing pattern signal control lines coupled between the timing pattern generator and each row in the array to carry the timing pattern signals to each row in the array.

3. The imaging array of claim 2, further comprising in each row individual row timing pattern signal control lines coupled to each pixel sensor in the row.

4. The imaging array of claim 3, further comprising:
in each row, timing pattern control signal switches coupled between the global timing pattern signal control lines and the row timing pattern control signal lines, each of the timing pattern control switches gated by the row enable latch.

5. The imaging array of claim 4 wherein the row address generator circuit is operatively coupled to operate each row enable latch.

6. The imaging array of claim 5 wherein the row address generator circuit comprises a row enable latch control signal output driving a row enable latch control signal line coupled to each row enable latch, individual row address outputs for individual row address data, an address-valid enable output on an address-valid enable line, and an address row enable latch control signal on the enable latch control signal output prior to the timing pattern period.

7. The imaging array of claim 6 wherein:
the timing pattern signal control lines comprise a reset control signal line, a charge transfer control signal line, and a readout select control signal line;
the row timing pattern signal control lines in each row comprise an individual row reset line, a row charge transfer line, and a row readout select line coupled to each pixel sensor in each row; and
the timing pattern control switches in each row comprise a row reset switch coupled between the reset control signal line and the row reset line and gated by the row enable latch, a row charge transfer switch coupled between the charge transfer control signal line and the row charge transfer line and gated by the row enable latch, and a row readout select switch coupled between the row readout select control signal line and the row readout select line and gated by the row enable latch.

8. The imaging array of claim 6 wherein:
the row address generator circuit is configured to output more than one row address to select more than one row prior to the timing pattern period; and
the row enable latches are configured such that the more than one row identified by the more than one row address will gate the timing pattern control signals to the pixel sensors in the more than one selected rows at the start of the timing pattern period.

9. A method for operating an imaging array including a plurality of rows of pixel sensors, the method comprising:
during each timing pattern period, and responsive to gating a row address signal and a row address enable signal latching in a row enable latch in each row of the array one of row selection data and row de-selection data for an immediately following timing pattern period;
at a start of the immediately following timing pattern period generating timing pattern control signals and providing the timing pattern control signals to every row in the array; and
at the start of the timing pattern period gating the timing pattern control signals to operate the pixel sensors only in rows having latched row selection data.

10. The method of claim 9 wherein generating timing pattern control signals comprises:
generating a reset control signal;
generating a charge transfer control signal; and
generating a readout select control signal.

11. The method of claim 10 wherein gating the timing pattern control signals to the pixel sensors only in the rows having latched row selection data at the start of the timing pattern period comprises:
gating the reset control signal to a row reset line in the selected row;
gating the charge transfer control signal to a row charge transfer line in the selected row; and
gating the readout select control signal to a row readout select line in the selected row.

12. The method of claim 9 wherein gating the timing pattern control signals to the pixel sensors in the selected row at the start of the timing pattern period comprises:
providing in each row a timing control pattern switch for each timing control pattern signal; and
activating all of the timing control pattern switches for each timing control pattern signal only in the rows having latched row selection data at the start of the timing pattern period.

13. The method of claim 9 wherein latching in the row enable latch in each row of the array responsive to a row address signal and a row address enable signal one of row selection data and row de-selection data comprises latching row selection data in more than one row.

14. The method of claim 9 wherein latching in a row enable latch in each row of the array responsive to a row address signal and a row address enable signal one of row selection data and row de-selection data comprises gating the row address signal with the row address enable signal and latching in each row the gated row address signal and the one of row selection data and row de-selection data.

* * * * *